United States Patent
Lim

(10) Patent No.: US 9,123,271 B2
(45) Date of Patent: *Sep. 1, 2015

(54) APPARATUS AND METHOD FOR ESTABLISHING A NETWORK CONNECTION IN A PORTABLE TERMINAL

(71) Applicant: Samsung Electronics Co., Ltd., Gyeonggi-do (KR)

(72) Inventor: Hun Lim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,214

(22) Filed: Sep. 16, 2014

(65) Prior Publication Data
US 2015/0002494 A1 Jan. 1, 2015

Related U.S. Application Data

(63) Continuation of application No. 13/411,449, filed on Mar. 2, 2012, now Pat. No. 8,833,541.

(30) Foreign Application Priority Data

Mar. 2, 2011 (KR) ........................ 10-2011-0018567

(51) Int. Cl.
*G06K 7/00* (2006.01)
*G09G 5/00* (2006.01)
(Continued)

(52) U.S. Cl.
CPC .............. *G09G 5/00* (2013.01); *H04L 41/0809* (2013.01); *H04M 1/2755* (2013.01);
(Continued)

(58) Field of Classification Search
USPC .......... 235/375, 379, 380, 435, 439, 451, 462
See application file for complete search history.

(56) References Cited

U.S. PATENT DOCUMENTS 8,833,641 B2 * 9/2014 Lim .............................. 235/375
2003/0035137 A1 2/2003 Shijo et al.
(Continued)

FOREIGN PATENT DOCUMENTS

CN 101010912 A 8/2007
KR 10-2008-0042869 5/2008
(Continued)

OTHER PUBLICATIONS

International Search Report dated Sep. 28, 2012 in connection with International Application No. PCT/KR2012/001429.
(Continued)

*Primary Examiner* — Matthew Mikels

(57) ABSTRACT

An apparatus and method for establishing a network connection in a portable terminal. The apparatus includes a controller, an image acquisition unit, and a code image analyzer. The controller establishes a network connection with a peripheral terminal using network information acquired through a code image. The image acquisition unit captures the code image generated by the peripheral terminal. The code image analyzer analyzes the code image acquired by the image acquisition unit and acquires the network information of the peripheral terminal. The code image includes at least any one of network information of the peripheral terminal, code image generation information, and information on an automatic execution program to be automatically executed after code image recognition.

22 Claims, 9 Drawing Sheets

(51) Int. Cl.
H04M 1/2755 (2006.01)
H04L 12/24 (2006.01)
H04W 12/06 (2009.01)
H04W 48/08 (2009.01)
H04W 76/02 (2009.01)
H04W 84/12 (2009.01)

(52) U.S. Cl.
CPC ............ H04W 12/06 (2013.01); H04W 48/08 (2013.01); H04W 76/02 (2013.01); H04M 2250/06 (2013.01); H04W 84/12 (2013.01)

(56) References Cited

U.S. PATENT DOCUMENTS

2008/0043110 A1  2/2008  Aizawa
2010/0012715 A1  1/2010  Williams et al.
2010/0163613 A1  7/2010  Bucher et al.

FOREIGN PATENT DOCUMENTS

KR   10-2009-0063459       6/2009
WO   WO 2006/022432 A1     3/2006

OTHER PUBLICATIONS

Written Opinion of the International Searching Authority dated Sep. 28, 2012 in connection with International Application No. PCT/KR2012/001429.
Patent Examination Report dated Jul. 7, 2014 in connection with Australian Application No. 2012223816, 3 pages.
First Office Action dated Nov. 4, 2014 in connection with Chinese Patent Application No. 2012100531942; 28 pages.

* cited by examiner (e)

APPARATUS AND METHOD FOR ESTABLISHING A NETWORK CONNECTION IN A PORTABLE TERMINAL

CROSS-REFERENCE TO RELATED APPLICATION(S) AND CLAIM OF PRIORITY

This application is a continuation of U.S. patent application Ser. No. 13/411,449 filed Mar. 2, 2012 entitled "APPARATUS AND METHOD FOR ESTABLISHING A NETWORK CONNECTION IN A PORTABLE TERMINAL", which claims priority under 35 U.S.C. §119 to an application filed in the Korean Intellectual Property Office on Mar. 2, 2011 and assigned Serial No. 10-2011-0018567, the contents of both these patent applications are herein entire incorporated by reference.

TECHNICAL FIELD OF THE INVENTION

The present invention generally relates to computing devices, and more particularly, to an apparatus and method for establishing a network connection in a portable terminal.

BACKGROUND OF THE INVENTION

In recent years, portable terminals have become widespread in their use by enabling wireless voice calls and other general information exchange. With early portable terminals, it was generally recognized that these portable terminals could be designed to be relatively portable. However, with the development of various technologies, such as the introduction of wireless Internet, the portable terminal's utility has significantly increased in scope, considering the increased functionalities such as gaming, remote control using local area communications (LANs), image capturing by installed digital cameras, and Wireless Local Area Network (WLAN) functionality, in addition to its initial functionality of providing audio phone call services.

WLAN functionality generally provides a communication service such as the Internet for a portable terminal (e.g., a Portable Digital Assistant (PDA), a notebook computer, and the like) that may be located within a predetermined distance from an Access Point (AP). Initially WLAN devices had a propagation range of only 10 meters but, recently, has been expanded up to 50 meters to several hundreds meters. A transmission speed of WLAN has also been improved, so it was made possible to transmit/receive a large capacity of multimedia information.

To use the WLAN function, the portable terminal typically establish a network connection procedure with a peripheral terminal.

To establish the network connection procedure, the portable terminal typically performs many processes, which may include a process of searching and connecting to a wireless network, a process of inputting a network address, and a process of configuring security information.

Unlike a general computer, the portable terminal has a limited size of output screen having a limited size such that it may only provide a limited amount of visual content. So, the portable terminal generally performs more procedures than the general computer, which in certain cases, may cause an inconvenience. The portable terminal often uses protocols and/or parameters, such as a Service Set IDentifier (SSID), an Internet Protocol (IP) address, a Dynamic Host Configuration Protocol (DHCP), a Domain Name System (DNS), a subnet, a gateway, a Wired Equivalent Privacy (WEP), an Ad Hoc, an AP and the like. In this respect, a user not familiar to network configuration suffers a great difficulty in the network configuration.

At network configuration, a user of the portable terminal should input information that may include a combination of many characters and numbers. So, another problem may exist that, using multiple key input sequences, erroneous characters may be input thus causing a failure of network connection.

In addition, a problem typically occurs that security information leaks out to other people because the user identifies security information necessary for the network connection through vocal communication that may be overheard by others.

SUMMARY OF THE INVENTION

To address the above-discussed deficiencies of the prior art, it is a primary object to provide at least the advantages below. Accordingly, one aspect of the present invention is to provide an apparatus and method for establishing a network connection process of a portable terminal with another device.

Another aspect of the present invention is to provide an apparatus and method for generating a code image including network information associated with a portable terminal.

A further aspect of the present invention is to provide an apparatus and method for capturing a code image and acquiring network information of a peripheral device associated with a portable terminal.

Yet another aspect of the present invention is to provide an apparatus and method for generating a code image including information on a program generating the code image and information on a program to be executed after code image recognition (i.e., before or after network connection) using a portable terminal.

Still another aspect of the present invention is to provide an apparatus and method for, if network connection is not established during a predetermined time after code image generation, changing a format of a previously generated code image in a portable terminal.

In accordance with an aspect of the present invention, an apparatus for establishing a network connection in a portable terminal is provided. The apparatus includes a controller, an image acquisition unit, and a code image analyzer. The controller establishes a network connection with a peripheral terminal using network information acquired through a code image. The image acquisition unit captures the code image generated by the peripheral terminal. The code image analyzer analyzes the code image acquired by the image acquisition unit and acquires the network information of the peripheral terminal. The code image includes at least any one of network information of the peripheral terminal, code image generation information, and information on an automatic execution program to be automatically executed after code image recognition.

In accordance with another aspect of the present invention, an apparatus for generating a code image for network connection in a portable terminal is provided. The apparatus includes a controller, an information collector, and a code image generator. If an automatic connection program for automatically configuring a network with a peripheral terminal is executed, the controller generates and outputs a code image including network information. The information collector extracts the network information of the portable terminal and information on the automatic connection program. The code image generator generates the code image that includes the automatic connection program information and network information extracted by the information collector. The automatic connection program information includes at least any one of a name of the automatic connection program and version information.

In accordance with another aspect of the present invention, a method for establishing a network connection in a portable terminal is provided. The method includes, if an automatic connection program of automatically configuring a network with a peripheral terminal is executed, enabling an image acquisition unit, capturing a code image through the enabled image acquisition unit and acquiring network information included in the code image, and establishing a network connection with the peripheral terminal using the acquired network information. The code image includes at least any one of the network information of the peripheral terminal, code image generation information, and information on an automatic execution program to be automatically executed after code image recognition.

In accordance with another aspect of the present invention, a method for generating a code image for network connection in a portable terminal is provided. The method includes, if an automatic connection program for automatically configuring a network with a peripheral terminal is executed, extracting the network information of the portable terminal, extracting information on the automatic connection program, and generating a code image including the extracted automatic connection program information and network information. The automatic connection program information includes at least any one of a name of the automatic connection program and version information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8 discussed below, and the various embodiments used to describe the principles of the present disclosure in this patent document are by way of illustration only and should not be construed in any way to limit the scope of the disclosure.

Certain embodiments of the present invention will be described herein below with reference to the accompanying drawings. In the following description, well-known functions or constructions are not described in detail since they would obscure the invention in unnecessary detail.

The following description is made for an apparatus and method for simplifying a network connection process of a portable terminal by establishing a network connection by means of network information that is acquired from a code image generated in a peripheral device.

Figure 1:
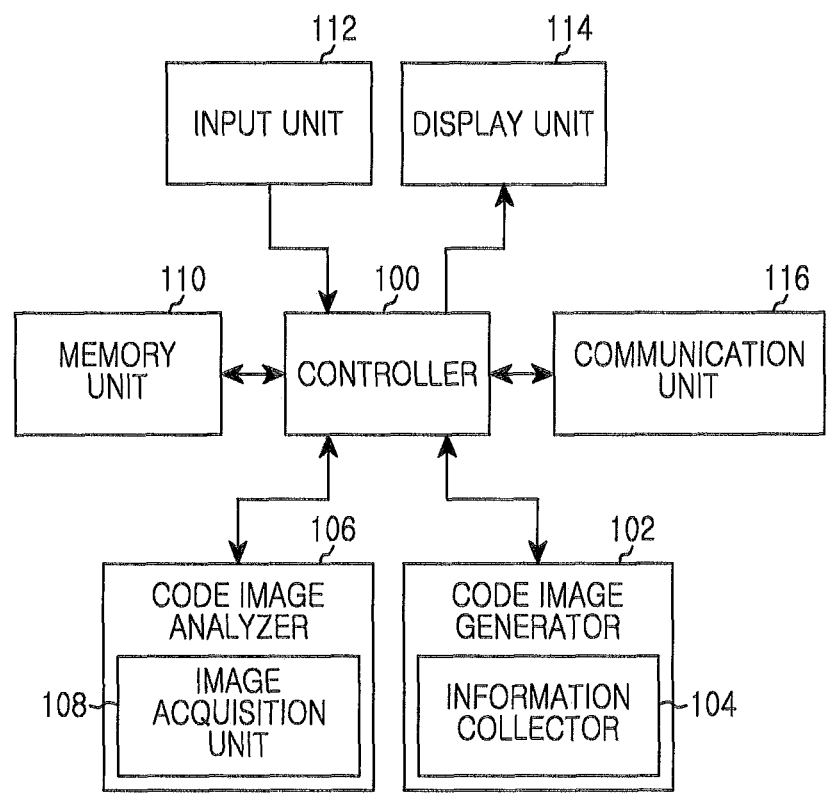
FIG. 1 illustrates an example portable terminal establishing a network connection process according to one embodiment of the present invention.

FIG. 1 illustrates an example portable terminal establishing a network connection process according to the present invention.

Referring to FIG. 1, the portable terminal includes a controller 100, a code image generator 102, a code image analyzer 106, a memory unit 110, an input unit 112, a display unit 114, and a communication unit 116. Also, the code image generator 102 can further include an information collector 104, and the code image analyzer 106 can further include an image acquisition unit 108.

The controller 100 of the portable terminal may control the code image generator 102 to perform an operation of waiting for a network connection, and can control the code image analyzer 106 to perform an operation of establishing the network connection.

The operation of waiting for the network connection is to wait for the network connection with a peripheral device after generating a code image including information related to network configuration of the portable terminal. If a program for generating the code image is executed, the controller 100 enters a network connection wait mode.

After that, the controller 100 acquires network information of the portable terminal and generates a code image including the network information. The controller 100 includes, in the code image, information related to network configuration such as the kind of its own available network interface, such as Ethernet, Wireless Fidelity (WiFi), Bluetooth and the like, an Internet Protocol (IP) address, a GateWay (OW), a NetMask (NM), a Domain Name System (DNS), an accessed Service Set IDentifier (SSID), a Wired Equivalent Privacy (WEP) key and the like.

Also, the controller 100 changes a format of the generated code image every predetermined time and, if network connection is delayed, initiate a new network connection.

Under the control of the controller 100, the code image generator 102 generates a code image including network configuration information. At this time, the code image generator 102 generates a code image such as a one-dimensional barcode, a two-dimensional barcode (i.e., a Quick Response (QR) code), a character string, a numeral string, a color code and the like. Besides the network information, the code image generator 102 can include, in the code image, code image generation information and information on a program to be automatically executed (i.e., an automatic execution program) after code image recognition (i.e., before or after connection performance with a peripheral device) together. Here, the code image generation information can be a name of a generation program, version information associated with the code image, and the like. The information on the automatic execution program can be a name of the program, a position of the program, a file name, order of execution, version information, and the like.

Under the control of the code image generator 102, the information collector 104 of the code image generator 102 collects network information of the portable terminal, information on an automatic execution program, and other code image generation information.

The operation of establishing the network connection is to analyze a code image of a peripheral device and establish the network connection with the peripheral device. If a program for analyzing the code image is executed, the controller 100 enters a mode of capturing the code image including information related to network configuration.

Accordingly, the controller 100 captures the code image, acquires the network information of the peripheral device that will establish the network connection, and establishes the network connection by means of the acquired network information. Further, the controller 100 can change a configuration or execution mode of the portable terminal having captured the code image, using the information on the automatic execution program included in the code image. The information on the automatic execution program may be a name of the program, a position of the program, a file name, order of execution and the like. At this time, before or after establishing the network connection with the peripheral device, the controller 100 can execute the automatic execution program and change the configuration or execution mode of the portable terminal.

Under the control of the controller 100, the code image analyzer 106 identifies a code image generated in a peripheral device and acquires information necessary for network connection. Further, the code image analyzer 106 can acquire code image generation information included in the code image and information on a program to be automatically executed after code image acquisition. The code image generation information is generation program information, a version of the program information, and the information on the automatic execution program is a name of the program, a position of the program, a file name, order of execution, version information, and the like.

Under the control of the code image analyzer 106, the image acquisition unit 108 of the code image analyzer 106 captures a code image that includes network information. The image acquisition unit 108 can be composed of a camera module. At this time, the code image acquisition unit 108 can either capture the code image by receiving an input of a capture button by a user or automatically capturing the code image through a function of acquiring a still picture continuous at a constant interval of time.

The memory unit 110 includes any suitable type of volatile or non-volatile storage, such as a Read Only Memory (ROM), a Random Access Memory (RAM), and a flash ROM. The memory stores instructions of a program for processing and controlling the controller 100, the code image generator 102 and the code image analyzer 106. In some cases, the memory may store a variety of reference data.

The RAM, a working memory of the controller 100, stores temporary data generated in execution of a variety of programs. The flash ROM stores a diversity of updateable data such as a phone book, an outgoing message, an incoming message, and information associated with a user's input. In addition, according to the present invention, the memory unit 110 stores a code image generated by the code image generator 102, network information analyzed by the code image analyzer 106, information on an automatic execution program, and information necessary for code image generation.

The input unit 112 may include numeric key buttons '0' to '9', a menu button, a cancel button, an 'OK' button, a talk button, an end button, an Internet button, navigation key (or direction key) buttons, and a plurality of function keys such as character input keys. The input unit 112 provides the controller 100 with key input data corresponding to keys pressed by a user, and can generate input data for the code image generation and input data for the code image analysis according to the present invention.

The display unit 114 displays state information generated during operation of the portable terminal, limited number of characters, a large amount of moving pictures and still pictures, and the like. According to the present invention, the display unit 114 outputs the code image and network information acquired through the code image. The display unit 114 may be a color Liquid Crystal Display (LCD), an Active Matrix Organic Light Emitting Diode (AMOLED), and the like. In cases where the display unit 114 includes a touch input device that is applied to a portable terminal of a touch input scheme, the display unit 114 can be used as an input device of the portable terminal.

The communication unit 116 performs a function of transmitting/receiving and processing a Radio Frequency (RF) signal of data input/output through an antenna (not illustrated). For example, in a transmission mode, the communication unit 116 performs a function of processing original data through channel coding and spreading, converting the original data into an RF signal, and transmitting the RF signal. In a reception mode, the communication unit 114 performs a function of converting a received RF signal into a baseband signal, processing the baseband signal through de-spreading and channel decoding, and restoring the signal to original data. Further, according to the present invention, the communication unit 114 includes a network interface including Bluetooth, WLAN, infrared interface and the like.

The above description is made for a portable terminal carrying out all of an operation of waiting network connection and an operation of establishing the network connection. However, in cases where the portable terminal performs only the operation of waiting for the network connection, the code image analyzer 106 may be excluded from the construction of the portable terminal. Inversely, in a case where the portable terminal performs only the operation of establishing the network connection, the code image generator 102 may be excluded from the construction of the portable terminal.

Roles of the code image generator 102 and the code image analyzer 106 can be implemented by the controller 100 of the portable terminal. However, these are separately constructed and shown in the present invention as an example construction for description convenience, and are not intended to limit the scope of the present invention. It should be understood by those skilled in the art that various modifications can be made within the scope of the present invention. For example, construction may be such that all of these are processed in the controller 100.

Figure 2:
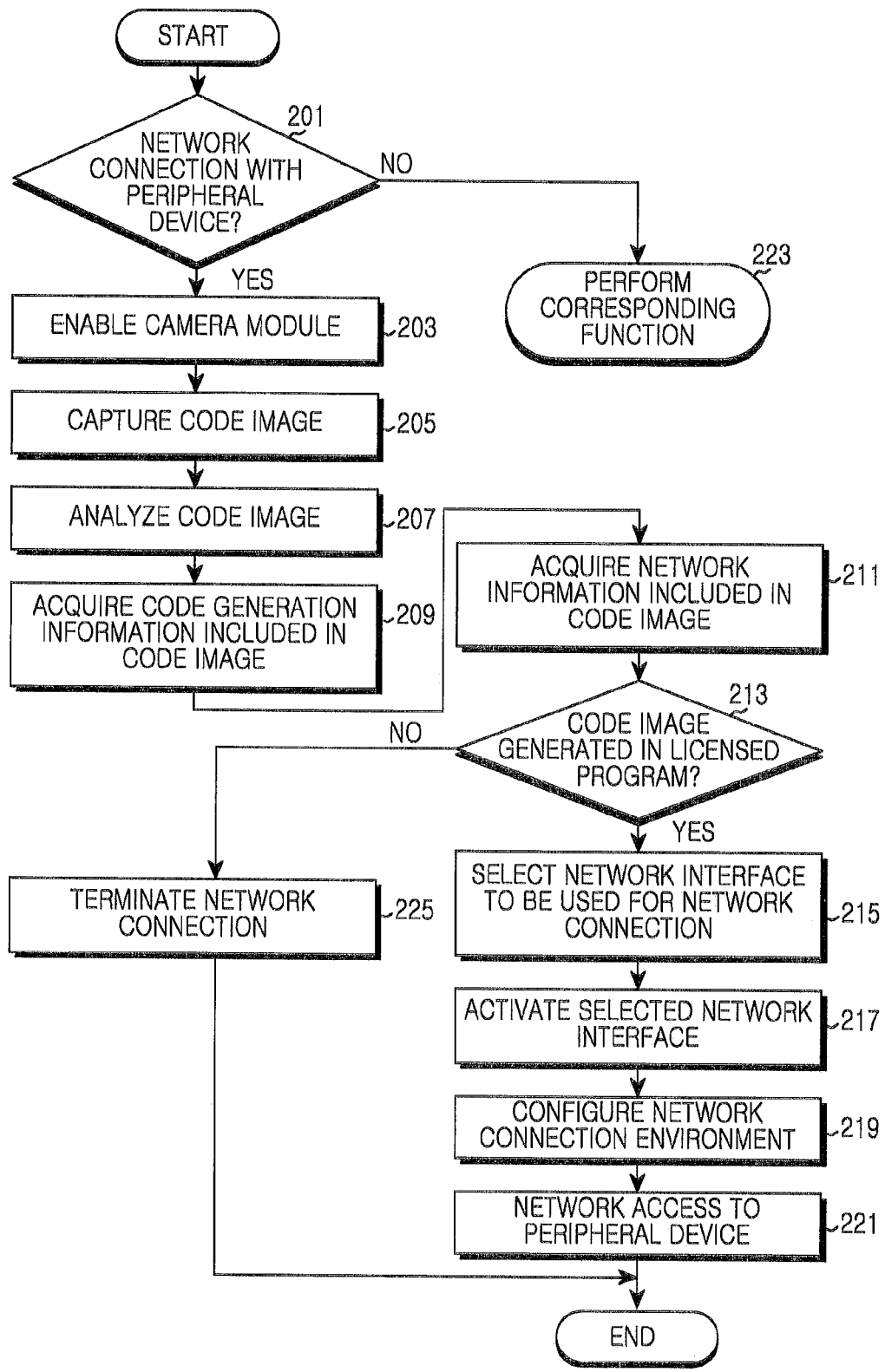
FIG. 2 illustrates an example process for establishing a connection mode in a portable terminal according to an embodiment of the present invention.

FIG. 2 illustrates an example process of establishing a connection mode in a portable terminal according to an embodiment of the present invention.

Referring to FIG. 2, the connection mode refers to an operation of identifying network information of a peripheral device and attempting to make a connection with the peripheral device.

In step 201, the portable terminal for establishing the connection mode identifies whether to establish the network connection with a peripheral device. Here, establishing the network connection signifies that the portable terminal operates in the connection mode.

If it is identified in step 201 not to establish the network connection with the peripheral device, the portable terminal proceeds to step 223 and performs a corresponding function (e.g., a wait mode).

Figure 8:
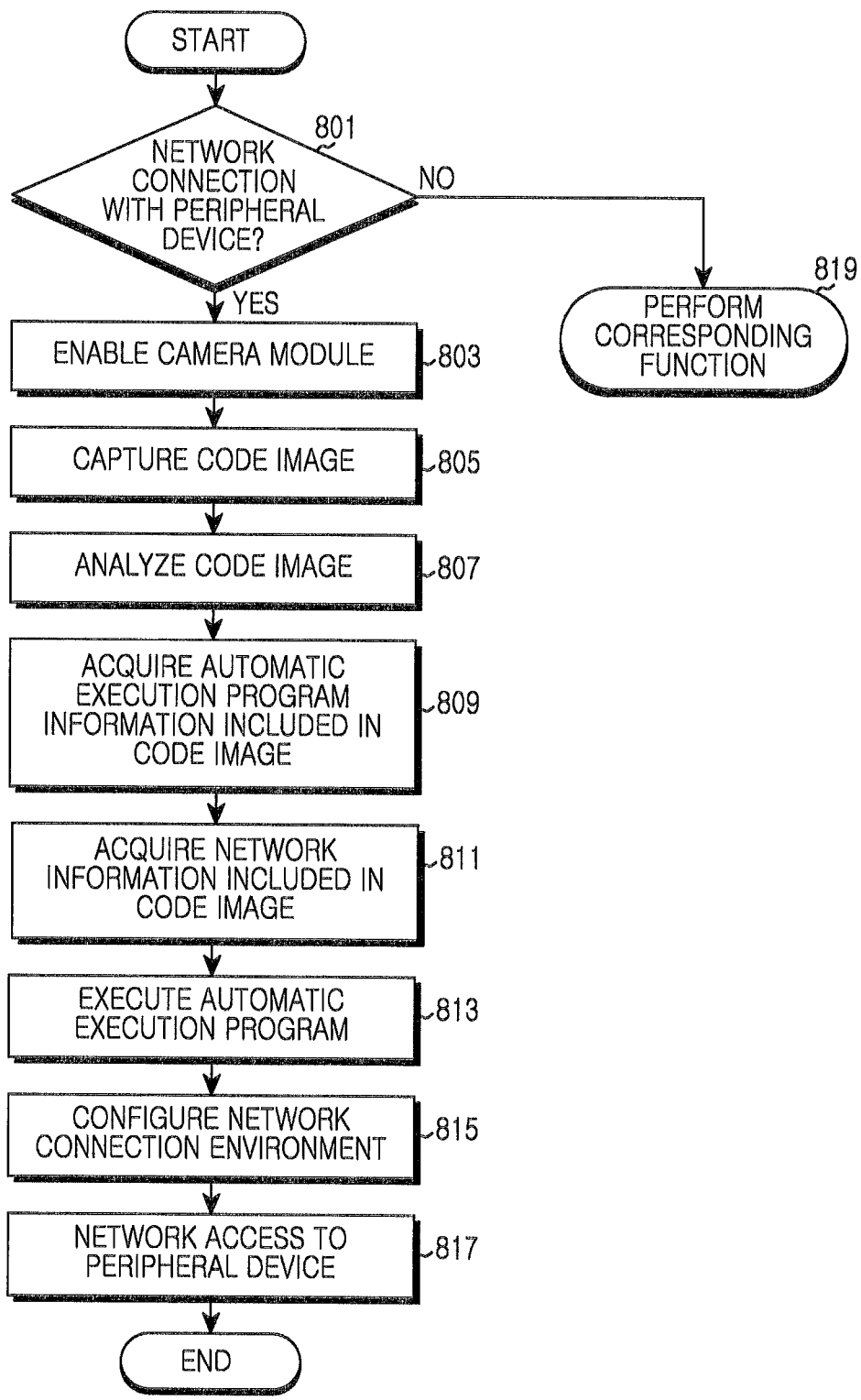
FIG. 8 illustrates an example process for establishing a connection mode in a portable terminal according to another embodiment of the present invention.

In contrast, if it is identified in step 201 to establish the network connection with the peripheral device, in step 203, the portable terminal enables a camera module and then, in step 205, captures a code image output to a screen of the peripheral device that will establish the network connection. Here, the code image is a code image including network information of the peripheral device, code image generation information, and information on a program to be automatically executed after connection performance with the peripheral device. The code image includes information, such as a one-dimensional barcode, a two-dimensional barcode (i.e., a QR code), a character string, a numeral string, a color code and the like. Further, the code image can also include information on a program to be automatically executed before connection with a peripheral device as illustrated in FIG. 8 below.

The code image generation information is to identify if a code image generated to establish the network connection in a peripheral device is a code image generated in a licensed program. The code image generation information includes a name of the program generating the code image and may also include program version information. By using the code image generation information, the portable terminal can prevent attempting network connection by means of information of a code image not generated in a peripheral device that will establish the network connection. Also, the network information of the peripheral device is network configuration information of the peripheral device, and may include information related to network configuration such as the kind of network (e.g., Ethernet, WiFi, Bluetooth and the like) of a network interface used in the peripheral device, such as an IP address, a GW, an NM, a DNS, an accessed SSID, a WEP key, and the like.

After capturing the code image of the peripheral device as above, the portable terminal analyzes the captured code image at step 207 and then, acquires the code image generation information included in the captured code image at step 209.

After that, the portable terminal acquires network configuration information included in the captured code image at step 211 and then, at step 213 identifies whether the captured code image is a code image generated in a licensed program using the code image generation information acquired in step 209.

If it is identified in step 213 to capture a code image generated in a non-licensed program, the portable terminal terminates the network connection at step 225 and then, terminates an algorithm according to the present invention.

In contrast, if it is identified in step 213 to capture the code image generated in the licensed program, the portable terminal selects a network interface to be used for the network connection at step 215. At this time, the portable terminal identifies the network information of the peripheral device acquired in step 211 and selects the same network interface as a network interface of the peripheral device. For example, assuming that the portable terminal uses an infrared network interface and a WLAN network interface, in a case where the portable terminal analyzes the code image and confirms that the peripheral device is using a Bluetooth, WLAN network interface, the portable terminal intends to select the WLAN network interface among the infrared network interface and the WLAN network interface, connecting with the peripheral device.

Next at step 217, the portable terminal activates the network interface selected in step 215 and then, configures a network connection environment at step 219. At this time, the portable terminal configures the network connection environment by performing certain steps, such as searching and connecting a wireless network, a step of inputting a network address, a step of configuring security, and the like.

After that, the portable terminal performs network access to the peripheral device and then, terminates the algorithm according to the present invention at step 221.

At this time, in a case where the portable terminal analyzes a code image and determines that information on an automatic execution program exists, the portable terminal executes the automatic execution program after establishing the network connection with the peripheral device.

Figure 3:
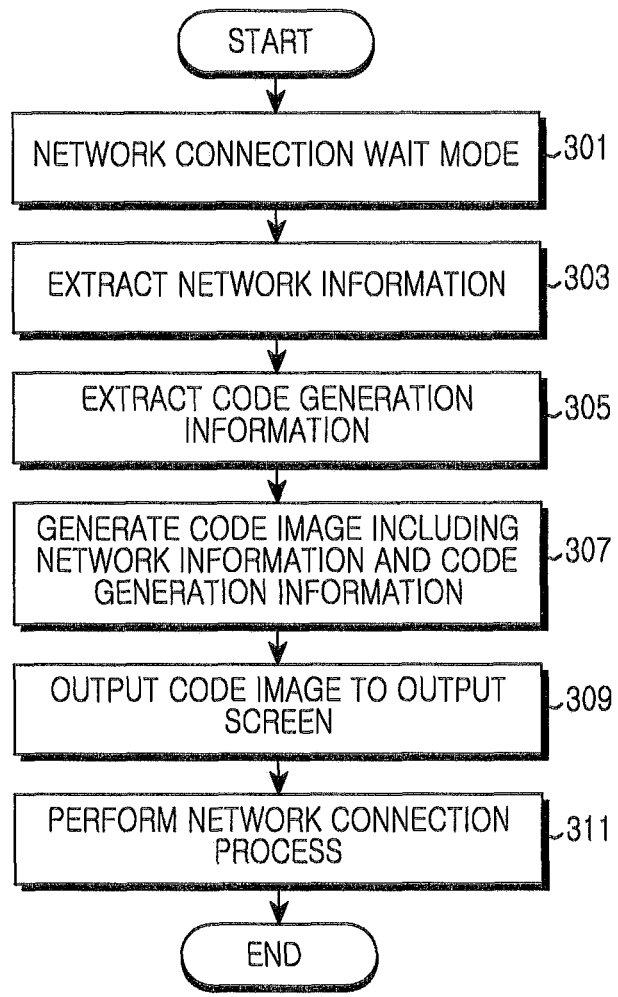
FIG. 3 illustrates an example process for establishing a connection wait mode in a peripheral device according to an embodiment of the present invention.

FIG. 3 illustrates an example process of establishing a connection wait mode in a peripheral device according to an embodiment of the present invention.

Referring to FIG. 3, in step 301, the peripheral device initiates a network connection wait mode of providing network information of the peripheral device by means of a code image.

After that, the peripheral device extracts network information at step 303. Here, the network information includes information related to network configuration such as the kind of network (e.g., Ethernet, WiFi, Bluetooth and the like) of a network interface used in the peripheral device, an IP address, a GW, an NM, a DNS, an accessed SSID, a WEP key, and the like.

Next, the peripheral device extracts code image generation information used for identifying if the code image is a code image generated in a licensed program at step 305. After that, the peripheral device generates a code image including the extracted code image generation information and network information at step 307. Also, the peripheral device can include in the code image, information on a program automatically executed before or after network connection. The information on the program may include a name of the program, a position of the program, a file name, order of execution, version information, and the like.

After that, the peripheral device outputs the code image to an output screen at step 309. And then, the peripheral device establishes a network connection process with a portable terminal at step 311. At this time, the portable terminal can capture the code image output from the peripheral device, extract network configuration information of the peripheral device, and perform the network connection process with the peripheral device using the extracted network configuration information.

That is, a user of the portable terminal can establish a connection with the peripheral device while omitting certain process steps, such as a network search process for the peripheral device, a network address input process, and a security configuration process.

Next, the peripheral device terminates an algorithm according to the present invention.

Figure 4A:
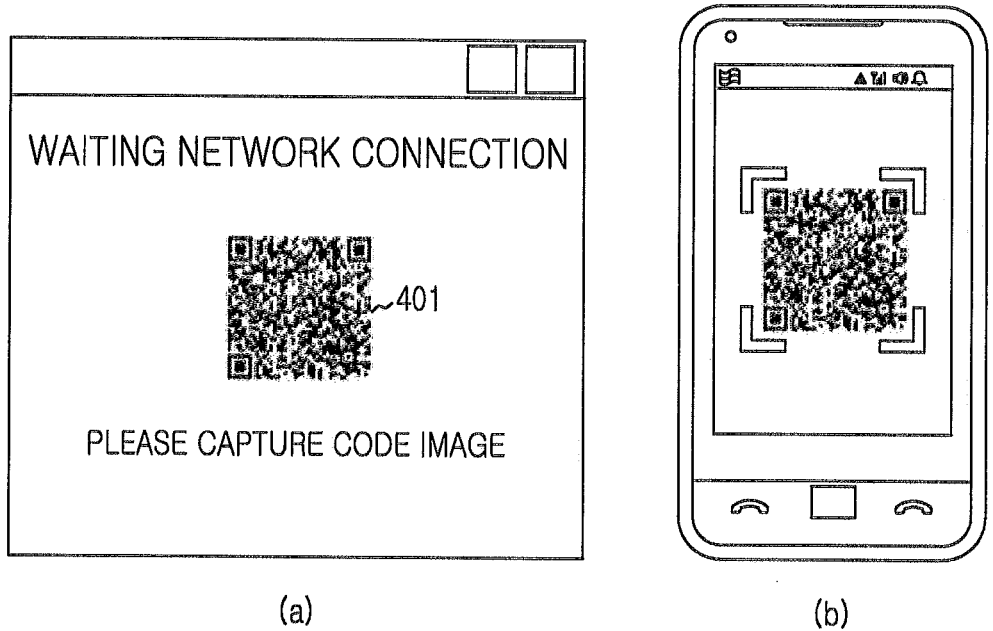
FIGS. 4A and 4B illustrate an example network connection process between a portable terminal and a peripheral device according to an embodiment of the present invention.
Figure 4A:
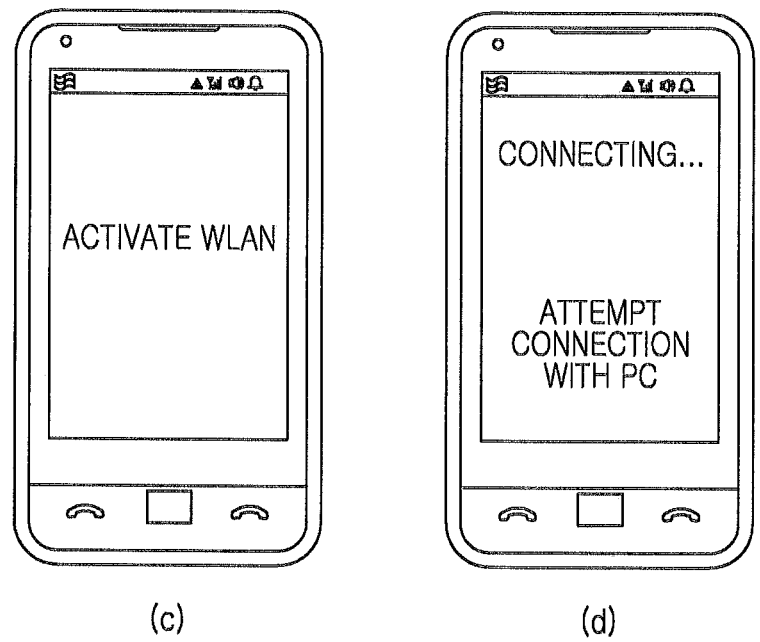
Figure 4B:
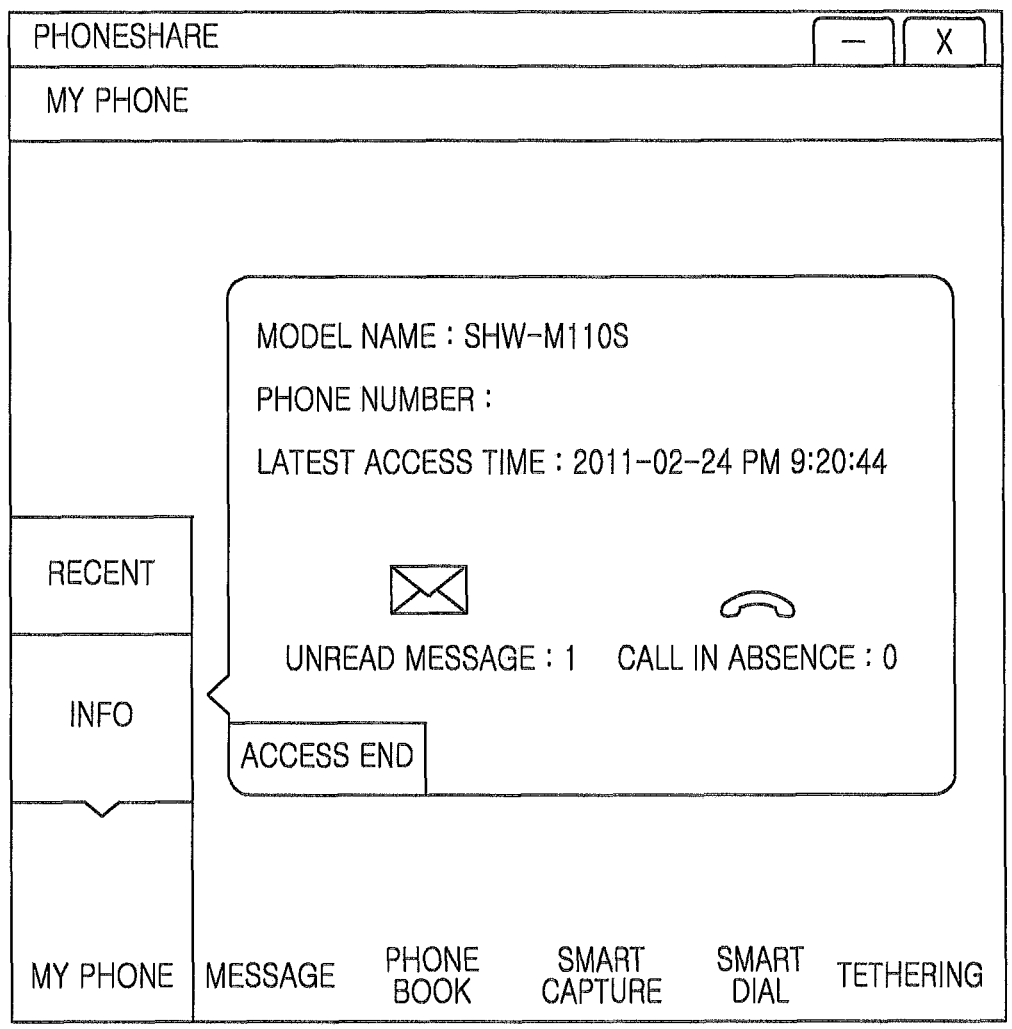

FIGS. 4A and 4B illustrates how an example network connection process between a portable terminal and a peripheral device may be accomplished according to one embodiment of the present invention.

Referring to FIGS. 4A and 4B, in a case where a user of the portable terminal intends to establish a network connection with the peripheral device, he/she may set the kind of a network interface used in the peripheral device, address information necessary for the network connection, and security information himself/herself. If the user fails to recognize the above information, the user may be inhibited from establishing the network connection.

Accordingly, the peripheral device generates a code image including network information necessary for network environment configuration.

The code image can be generated in a two-dimensional barcode format (401) as indicated by FIG. 4A(a) Or, the code image can be generated even in combined formats of a one-dimensional barcode, a character string, a numeral string, a color code.

The code image includes code image generation information (i.e., a name of a program generating the code image, program version information) used for confirming that the code image is a code image generated to establish the network connection in a peripheral device, and network information such as the kind (e.g., Ethernet, WiFi, Bluetooth and the like) of a network interface used in the peripheral device, an IP address, a GW, an NM, a DNS, an accessed SSID, a WEP key and the like. Also, the code image can include information on a program automatically executed before or after the network connection. The peripheral device processes to output the generated code image to an output screen.

In a case where the code image is output from the peripheral device as above, the portable terminal captures the output code image as indicated by of FIG. 4A (b).

At this time, the portable terminal can either capture the code image by receiving an input of a capture button by a user or can capture the code image through a function of automatically acquiring a still picture continuous at a constant interval of time.

The portable terminal capturing the code image as above can acquire network information on the peripheral device from the captured code image. That is, the portable terminal identifies information related to network configuration such as the kind of network (e.g., Ethernet, WiFi, Bluetooth and the like) of a network interface used in the peripheral device, an IP address, a GW, an NM, a DNS, an accessed SSID, a WEP key and the like and activates a network interface (e.g., a WLAN network interface) connectable with the peripheral device as indicated by FIG. 4A(c). After that, the portable terminal configures a network connection environment and then, establishes a connection process with the peripheral device (e.g., a PC) as indicated by FIG. 4A(d).

Also, in a case where the portable terminal identifies information on a program automatically executed after network connection in the code image, the portable terminal may execute a synchronization program for synchronizing with the peripheral device after the network connection is created, performing a process of synchronization of a contact, a message, an address list and the like as indicated by FIG. 4B(e). In a case where the portable terminal identifies the information on the program automatically executed before the network connection in the code image, the portable terminal may change an execution mode of the portable terminal before the network connection through the automatic execution program, or previously execute a synchronization program and wait a synchronization process.

Figure 5:
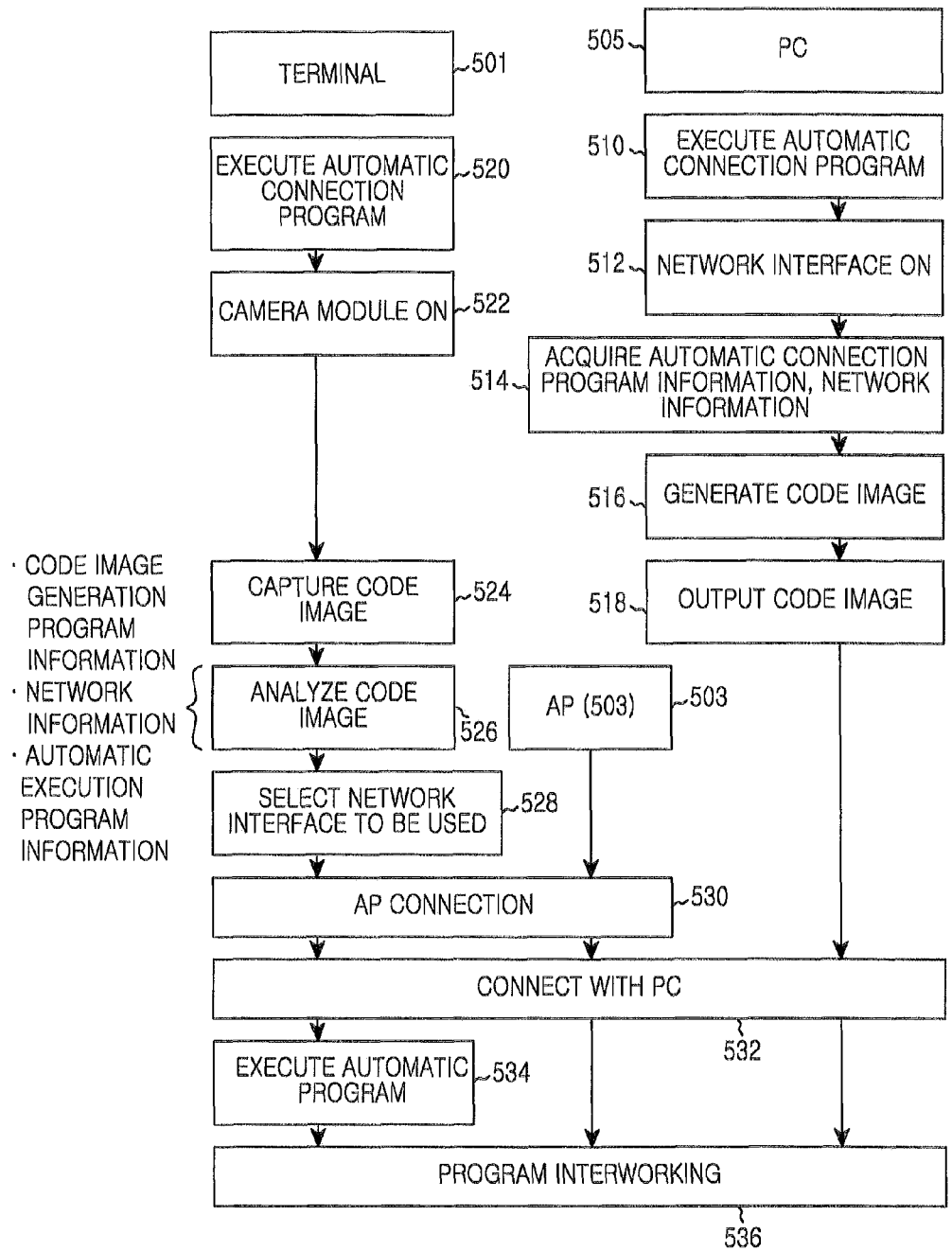
FIG. 5 illustrates an example process for establishing network connection with a Personal Computer (PC) in a portable terminal according to an embodiment of the present invention.

FIG. 5 illustrates an example process of establishing a network connection with a PC in a portable terminal according to an embodiment of the present invention.

Referring to FIG. 5, a PC 505 uses a WLAN network interface, and performs a synchronization program after a network connection is established. In other embodiments, the PC 505 may use any suitable protocol for establishing a network connection.

First, the PC 505 enters a connection wait mode by executing an automatic connection program at step 510 and then, activates the WLAN network interface at step 512. Here, the automatic connection program refers to a program of automatically configuring and connecting a network between the portable terminal 501 and the PC 505.

After that, the PC 505 acquires information on the automatic connection program and network information at step 514 and then, acquires network information and automatic connection program information by a code image at step 516. Here, the PC 505 adds the automatic connection program information (e.g., a name of the program, version information) to the code image so as to represent if the code image is a code image generated in a licensed program.

Also, as the PC 505 will execute a synchronization program after network connection, the PC 505 may add information on the fact that it will execute the synchronization program together to the code image.

After the PC 505 generates the code image that includes the network information of the PC 505, the information of the program generating the code image, and the information on the program to be executed after network connection as above, the PC 505 processes to output the code image to an output screen at step 518.

According to this, the portable terminal 501 intending to establish a network connection with the PC 505 executes an automatic connection program for identifying the network information of the PC 505 at step 520 and then, enables a camera module for capturing the code image generated by the PC 505 at step 522.

Next, the portable terminal 501 captures the code image through the enabled camera module at step 524 and then, analyzes the captured code image at step 526 To analyze the code image, the portable terminal 501 may use code image generation program information, network information, and/or automatic execution program information. At this time, the portable terminal 501 will acquire a name and version of the automatic connection program of the PC 505 generating the code image, the network information (i.e., interface information) corresponding to a WLAN, and the information on the program (e.g., the synchronization program) to be automatically executed after network connection.

Next, as the portable terminal 501 confirms that a WLAN network interface is available in the PC 505 that will establish the network connection, the portable terminal 501 can determine that even itself has to use a WLAN network interface at step 528.

After that, the portable terminal 501 performs a process of accessing an AP 503 that has been accessed by the WLAN network interface of the PC 505, using the WLAN network interface at step 530 and then, attempts connection with the PC 505 through connection with the AP 503 at step 532.

Next, the portable terminal 501 confirms that the PC 505 will execute the synchronization program after the network connection through the code image analysis, and executes its own synchronization program at step 534.

After that, the portable terminal 501 performs a program interworking process (i.e., address list synchronization, message synchronization) with the PC 505 by the executed synchronization program at step 536.

Next, the portable terminal 501 and PC 505 terminate the algorithm according to the present invention.

Figure 6:
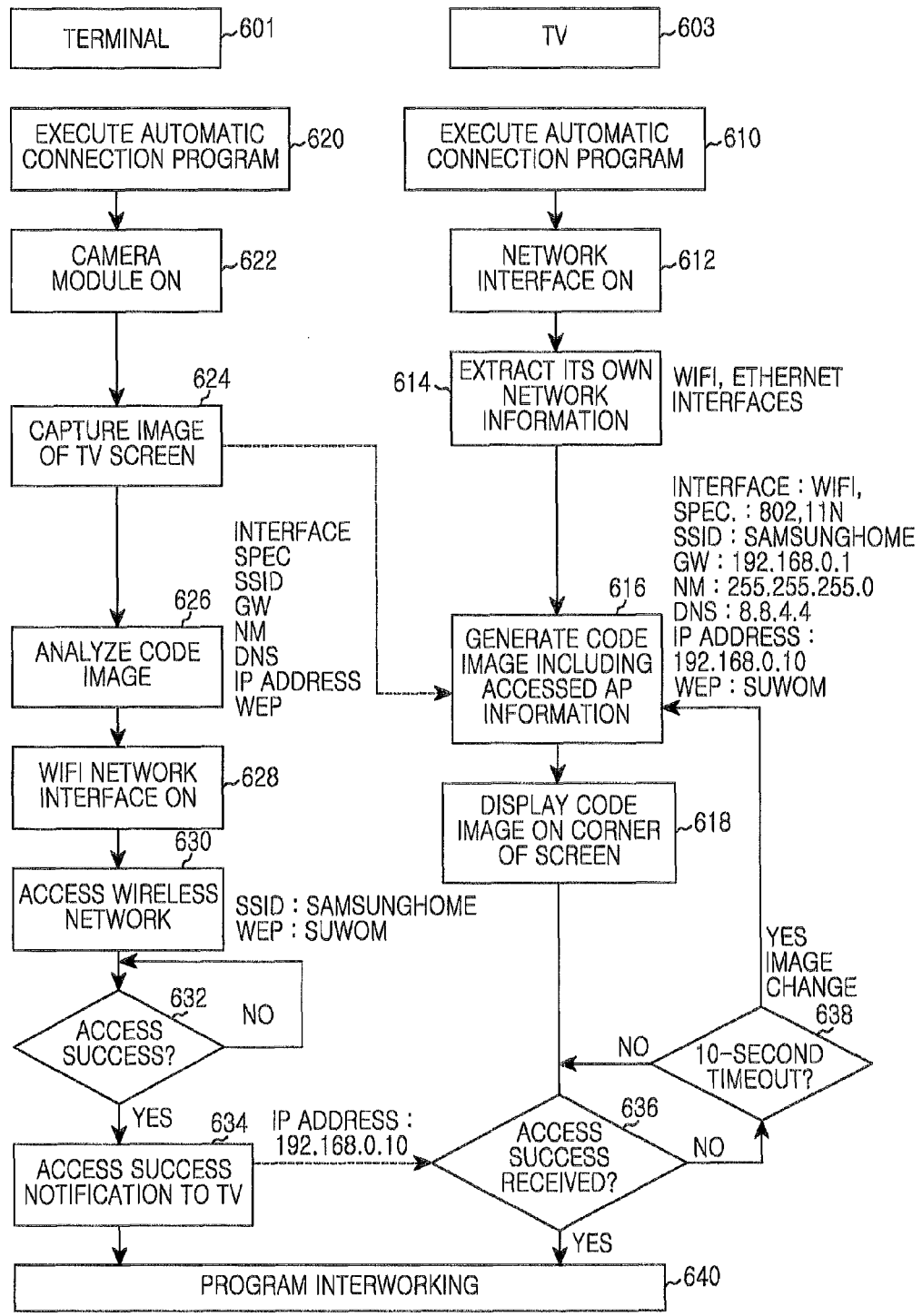
FIG. 6 illustrates an example process for establishing a network connection with a television (TV) in a portable terminal according to an embodiment of the present invention.

FIG. 6 illustrates an example process of establishing a network connection with a television (TV) in a portable terminal according to an embodiment of the present invention.

Referring to FIG. 6, in one embodiment, the TV 603 supports WLAN and Ethernet network interfaces. In other embodiments, the TV may support any suitable type of network interface.

First, the TV 603 enters a connection wait mode by executing an automatic connection program at step 610 and then, activates the WLAN network interface at step 612. Here, the automatic connection program refers to a program of automatically configuring and connecting a network between the portable terminal 601 and the TV 603.

After that, the TV 603 acquires information on the automatic connection program and its own network information (i.e., information supporting the WLAN and Ethernet network interfaces) at step 614 and then, acquires network information and automatic connection program information by a code image at step 616.

At this time, the TV 603 identifies a network interface that is in connection to a network among the identified network information, and generates a code image including information on an AP accessed by means of the identified network interface. For one instance, the code image generated by the TV 603 can include network information of Table 1 below.

TABLE 1

| Interface | WiFi |
|---|---|
| Spec | 802.11n |
| SSID | SamsungHome |
| Gateway | 192.168.0.1 |
| Netmask | 255.255.255.0 |
| DNS | 8.8.4.4 |
| IP Address | 192.168.0.10 |
| WEP | suwon |

That is, the TV 603 confirms that it has been connected to a network group corresponding to "SamsungHome" through the WLAN among the WLAN and Ethernet network interfaces, and identifies and includes a GW, an NM, a DNS, an IP address, and a WEP necessary for network connection, in the code image.

Next, the TV 603 processes to output the generated code image to part of an output screen at step 618.

According to this, the portable terminal 601 intending to establish a network connection with the TV 603 executes an automatic connection program for identifying the network information of the TV 603 at step 620 and then, enables a camera module for capturing the code image generated by the TV 603 at step 622.

After that, the portable terminal 601 captures the code image through the enabled camera module at step 624 and then, analyzes the captured code image to acquire the network information of the TV 603 at step 626. At this time, the portable terminal 601 can first identify if the code image is a code image generated in a licensed program, by confirming a name and version of the automatic connection program of the TV 603 generating the code image.

In a case where it is confirmed that the code image is the image generated in the licensed program, the portable terminal 601 activates the same WLAN network interface as a network interface currently establishing network connection in the TV 603 at step 628 and then, attempts a wireless network access at step 630. At this time, the portable terminal 601 attempts network connection using SSID and WEP information acquired from the code image.

Next, the portable terminal 601 identifies if the network access has succeeded at step 632. In a case where the network access succeeds, the portable terminal 601 sends a network access success notification to the TV 603 using the IP address (i.e., 192.168.0.10) included in the code image at step 634.

According to this, the TV 603 receives the network access success notification from the portable terminal 601 (step 636) and then performs a program interworking process (step 640).

In a case where the TV 603 does not receive the network access success notification during a predetermined time (i.e., a threshold of 10 seconds) from the portable terminal 601 at step 638, the TV 603 processes to initiate a new network access process to change a format of the previously generated code image.

Next, the terminal 601 and TV 603 terminate the algorithm according to the present invention.

Figure 7:
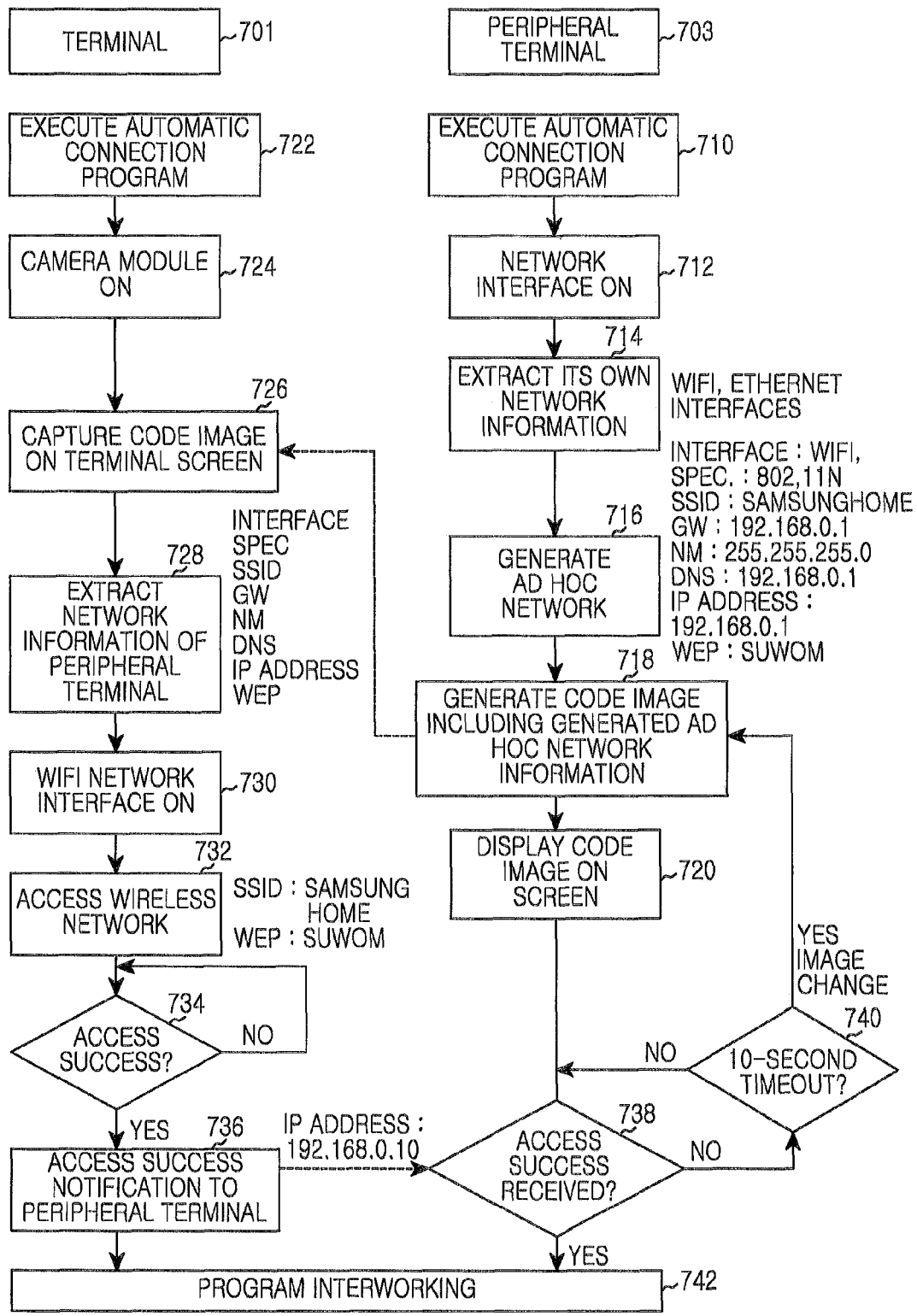
FIG. 7 illustrates an example process for forming an Ad Hoc network with a peripheral portable terminal in a portable terminal according to an embodiment of the present invention.

FIG. 7 illustrates an example process of forming an Ad Hoc network with a peripheral portable terminal in a portable terminal according to an embodiment of the present invention.

Referring to FIG. 7, it is assumed that the peripheral terminal 703 supports WLAN and Bluetooth network interfaces and is in a situation in which it is desired to share a file with a peripheral friend through wireless connection but there is not a wireless network or it is not desired to access an AP of low security. In other embodiments, the peripheral terminal 703 may support any suitable network interface.

First, the peripheral terminal 703 enters a connection wait mode by executing an automatic connection program at step 710 and then, activates the WLAN network interface at step 712. Here, the automatic connection program refers to a program automatically configuring and connecting a network between the peripheral terminal 703 and another portable terminal 701.

After that, the peripheral terminal 703 acquires information on the automatic connection program and its own network information (i.e., information supporting the WLAN and Bluetooth network interfaces) at step 714 and then, forms an Ad Hoc network at step 716. At this time, the peripheral terminal 703 can identify Ad Hoc network information as shown in Table 2 below.

TABLE 2

| Interface | WiFi |
|---|---|
| Spec | 802.11n |
| SSID | SamsungAdHoc |
| Gateway | 192.168.0.1 |
| Netmask | 255.255.255.0 |
| DNS | 8.8.4.4 |
| IP Address | 192.168.0.10 |
| WEP | suwon |

That is, the peripheral terminal 703 can confirm that it has been connected to a network group corresponding to "SamsungAdHoc" through the WLAN among the WLAN and Bluetooth network interfaces, and identify a GW, an NM, a DNS, an IP address, and a WEP necessary for network connection.

Next, the peripheral terminal 703 processes to generate a code image including the formed Ad Hoc network information at step 718 and then, output the generated code image to an output screen at step 720.

According to this, the portable terminal 701 intending to establish a network connection with the peripheral terminal 703 executes an automatic connection program for identifying the network information of the peripheral terminal 703 at step 722 and then, the portable terminal 701 enables a camera module for capturing the code image generated by the peripheral terminal 703 at step 724.

Next, the portable terminal 701 captures the code image through the enabled camera module at step 726 and then, analyzes the captured code image to acquire the Ad Hoc network information of the peripheral terminal 703 at step 728. At this time, the portable terminal 701 can first identify if the code image is a code image generated in a licensed program by confirming a name and version of the automatic connection program of the peripheral terminal 703 generating the code image. By analyzing the code image, the portable terminal 701 can confirm that the peripheral terminal 703 has been connected to a network group corresponding to "SamsungAdHoc" using the WLAN network interface, uses the DNS (i.e., 192.168.0.1), the GW (i.e., 192.168.0.1), and the IP address (i.e., 192.168.0.10), and uses the NM (i.e., 255.255.255.0). Also, the portable terminal 701 can confirm that it uses "Suwon" as the WEP of the peripheral terminal 703 and, at the time of security connection, the portable terminal 701 can use the confirmed WEP information.

In a case where it is confirmed that the code image is a code image generated in a licensed program, the portable terminal 701 activates the same WLAN network interface as a network interface currently performing Ad Hoc network connection in the peripheral terminal 703 at step 730 and then, attempts a wireless network access at step 732. At this time, the portable terminal 701 attempts network connection using SSID and WEP information acquired from the code image.

Next, the portable terminal 701 confirms that the network access has succeeded and then, in a case where the network access succeeds, the portable terminal 701 sends a network access success notification to the peripheral terminal 703 using the IP address (i.e., 192.168.0.10) included in the code image at step 736.

According to this, the peripheral terminal 703 receives the network access success notification from the portable terminal 701 at step 738 and then, performs a program interworking process at step 742.

In a case where the peripheral terminal 703 does not receive the network access success notification during a predetermined time (i.e., a threshold of 10 seconds) from the portable terminal 701 at step 740, the peripheral terminal 703 processes to initiate a new network access process to change a format of the previously generated code image. At step 742, the peripheral terminal 703 establishes a connection with the portable terminal 701.

Next, the peripheral terminal 703 and the portable terminal 701 terminate the algorithm according to the present invention.

FIG. 8 illustrates an example process of performing a connection mode in a portable terminal according to another embodiment of the present invention.

Referring to FIG. 8, the connection mode refers to an operation of identifying network information of a peripheral device and attempting to establish a connection with the peripheral device.

First in step 801, the portable terminal for performing the connection mode identifies whether to establish a network connection with the peripheral device. Here, establishing the network connection signifies that the portable terminal operates in the connection mode. If it is identified in step 801 not to establish the network connection with the peripheral device, the portable terminal performs a corresponding function (e.g., a wait mode) at step 819.

In contrast, if it is identified in step 801 to establish the network connection with the peripheral device, the portable terminal enables a camera module at step 803 and then, captures a code image output to a screen of the peripheral device that will establish the network connection at step 805. Here, the code image is a code image including network information of the peripheral device, code image generation information, and information on a program to be automatically executed after code image analysis. The code image may includes a one-dimensional barcode, a two-dimensional barcode (i.e., a QR code), a character string, a numeral string, a color code, and the like.

The code image generation information may include information associated with whether the code image generated to establish the network connection in the peripheral device is a code image generated in a licensed program, and includes a name of the program generating the code image and program version information. By using the code image generation information, the portable terminal can prevent attempting the network connection through information of a code image not generated in the peripheral device that will establish the network connection. Also, the network information of the peripheral device includes network configuration information of the peripheral device, and includes information related to network configuration such as the kind of network (e.g., Ethernet, WiFi, Bluetooth and the like) of a network interface used in the peripheral device, such as an IP address, a OW, an NM, a DNS, an accessed SSID, WEP key and the like. Also, the information on the program to be automatically executed after the code image analysis is for a program executed before or after the network connection is established with the peripheral device, and can be a program for configuration and execution mode change of the portable terminal and a program for interworking with the peripheral device.

Next at step 807, the portable terminal analyzes the captured code image and then acquires the automatic execution program information included in the code image at step 809.

After that, the portable terminal acquires the network information included in the code image at step 811 and then executes the automatic execution program at step 813. At this time, the portable terminal can change an execution mode and configuration value of the portable terminal using the acquired automatic execution program information (e.g., a position of an execution file, a file name) since the peripheral device recognizes information on a function and program executed in the portable terminal and generates a code image. Also, the portable terminal can identify the code image generation information before execution of the automatic execution program, identifying if the code image is a code image generated in a licensed program.

Next at step 815, the portable terminal configures a network connection environment after selecting and activating a network interface connectable with the peripheral device based on the network configuration information included in the captured code image. At this time, the portable terminal configures the network connection environment by performing a step of searching and connecting a wireless network, a step of inputting a network address, a step of security configuration and the like.

At step 817, the portable terminal performs network access to the peripheral device and then, terminates an algorithm according to the present invention.

In FIG. 8, a description has been made, for example, for changing a configuration and mode of a portable terminal before establishing a network connection using automatic execution program information acquired through a code image; however, the present invention can perform interworking with the peripheral device at the same time of the network connection, by executing a specific program before the network connection with the peripheral device and waiting according to the present invention. For one example, the portable terminal will be able to perform data synchronization at the same time of establishing the network connection, after previously executing a synchronization program through the code image.

As described above, certain embodiments of the present invention relates to an apparatus and method for simplifying a network connection process of a portable terminal, and can solve network configuration information input errors and security key leaks by establishing the network connection by means of network information acquired from a code image generated in a peripheral device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A first electronic device configured to establish a network connection, the device comprising:
    a controller, in response to an execution of an automatic connection program to automatically connect with a second electronic device, configured to:
        acquire network information of the second electronic device based on a code image generated by the second electronic device and captured by a camera;
        establish the network connection with the second electronic device based on the acquired network information; and
        execute an instruction corresponding to automatic execution instruction information in the code image,
    wherein the code image comprises at least one of: the network information of the second electronic device and the automatic execution instruction information.

2. The electronic device of claim 1, wherein the automatic execution instruction information comprise at least one of: instructions configured to cause the controller to perform an execution mode change, instructions configured to cause the controller to perform a configuration change, and instructions configured to be executed by the controller after the network connection is established.

3. The electronic device of claim 1, wherein, when the code image is a code image generated in licensed instructions, the controller is configured to establish the network connection with the second electronic device and, when the code image is not the code image generated in the licensed instructions, the controller is configured to stop a network connection process with the second electronic device.

4. The electronic device of claim 1, wherein the controller is further configured to acquire at least one of: a kind of a network interface supported in the second electronic device, an Internet Protocol (IP) address, a GateWay (GW), a NetMask (NM), a Domain Name System (DNS), an accessed Service Set IDentifier (SSID), a Wired Equivalent Privacy (WEP) key, code image generation information, and the automatic execution instruction information.

5. The electronic device of claim 1, wherein the code image further comprises a name of instructions generating the code image.

6. The electronic device of claim 1, wherein the controller is configured to identify when the code image is a code image generated using licensed instructions by analyzing a name of instructions generating the code image.

7. The electronic device of claim 1, wherein the code image further comprises instruction version information.

8. The electronic device of claim 1, wherein the controller is configured to capture the code image of at least one of:
    a one-dimensional barcode format,
    a two-dimensional barcode format,
    a character string format,
    a numeral string format, and
    a color code format.

9. The electronic device of claim 1, wherein the controller is configured to:
    after outputting the code image and when the network connection is not performed during a predetermined time, change a format of the generated code image; and
    output the changed code image.

10. The electronic device of claim 1, wherein the controller is configured to execute synchronization instructions configured to cause the controller to synchronize with the second electronic device after the network connection is established.

11. A method implemented using a first electronic device configured to establish a network connection, the method comprising:
    acquiring network information of a second electronic device based on a code image generated by the second electronic device and captured by a camera;
    establishing the network connection with the second electronic device based on the network information; and
    executing a program corresponding to automatic execution instruction information in the code image, wherein the code image comprises at least one of: the network information of the second electronic device and the automatic execution instruction information.

12. The method of claim 11, wherein the automatic execution instruction information comprises at least one of: instructions configured to cause the controller to perform an execution mode change, instructions configured to cause the controller to perform a configuration change, and instructions to be executed by the controller after the network connection is established.

13. The method of claim 11, wherein, when the code image is a code image generated in licensed instructions, establishing the network connection with the second electronic device and, when the code image is not the code image generated in the licensed instructions, stopping a network connection process with the second electronic device.

14. The method of claim 11, further comprising acquiring at least one of: a kind of a network interface supported in the second electronic device, an Internet Protocol (IP) address, a GateWay (GW), a NetMask (NM), a Domain Name System (DNS), an accessed Service Set IDentifier (SSID), a Wired Equivalent Privacy (WEP) key, code image generation information, and the automatic execution instruction information.

15. The method of claim 11, wherein the code image further comprises a name of instructions generating the code image.

16. The method of claim 11, further comprising identifying when the code image is a code image generated using licensed instructions by analyzing a name of instructions generating the code image.

17. The method of claim 11, wherein the code image further comprises instruction version information.

18. The method of claim 11, wherein the code image is at least one of:
   a one-dimensional barcode format, a two-dimensional barcode format, a character string format, a numeral string format, and a color code format.

19. The method of claim 11, further comprising:
   after outputting the code image and when the network connection is not performed during a predetermined time, changing a format of the generated code image; and
   outputting the changed code image.

20. A system comprising;
   a first electronic device configured to generate a code image; and
   a second electronic device comprising,
      a camera configured to capture the code image generated by the first electronic device; and
      a controller, in response to an execution of automatic connection instructions to automatically connect with the first electronic device, configured to:
         acquire network information of the first electronic device based on the code image captured by the camera;
         establish the network connection with the first electronic device based on the acquired network information of the first electronic device; and
         automatically execute instructions corresponding to automatic execution instruction information in the code image, and wherein the code image comprises at least one of: the network information of the first electronic device and the information of the automatic execution instruction information.

21. An apparatus to manage an event of a display device, the apparatus comprising:
   a receiving unit configured to receive a control signal comprising event related information of an electronic device and information of an output region of a screen from a display device controller; and
   a display unit configured to display the event related information on the output region of the screen.

22. The apparatus of claim 21, wherein the output region comprises a smaller display region than a total display region of the screen.

* * * * *